(12) United States Patent
    Stapleton

(10) Patent No.: US 12,512,989 B1
(45) Date of Patent: Dec. 30, 2025

(54) TOKENIZATION FOR BIG DATA

(71) Applicant: Wells Fargo Bank, N.A., San Francisco, CA (US)

(72) Inventor: Jeffrey J. Stapleton, Arlington, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 222 days.

(21) Appl. No.: 18/099,086

(22) Filed: Jan. 19, 2023

(51) Int. Cl.
   H04L 9/32       (2006.01)
   G06F 21/60      (2013.01)
   G06F 21/62      (2013.01)
   H04L 9/06       (2006.01)

(52) U.S. Cl.
   CPC .......... H04L 9/3213 (2013.01); G06F 21/602 (2013.01); G06F 21/6245 (2013.01); H04L 9/0643 (2013.01); H04L 9/3247 (2013.01); H04L 9/3297 (2013.01)

(58) Field of Classification Search
   CPC ... H04L 9/3213; H04L 9/3247; H04L 9/3297; H04L 9/0643
   See application file for complete search history.

(56) References Cited

U.S. PATENT DOCUMENTS

| 11,153,097  | B1* | 10/2021 | Griffin ................ H04L 9/3263 |
| 2006/0101408 | A1* | 5/2006 | Kotamarthi ............ G06F 21/52 726/21 |
| 2007/0113172 | A1* | 5/2007 | Behrens ................ G06F 40/143 715/239 |
| 2008/0134337 | A1* | 6/2008 | Crescenzo ............ G06F 21/565 726/24 |
| 2016/0314315 | A1* | 10/2016 | Krogius ................ H04L 63/101 |
| 2019/0236273 | A1* | 8/2019 | Saxe ..................... G06F 18/214 |
| 2019/0253240 | A1* | 8/2019 | Treat ..................... H04L 9/3297 |
| 2023/0195932 | A1* | 6/2023 | Carnesecca .......... G06F 21/6245 726/26 |
| 2023/0306439 | A1* | 9/2023 | Coleman .............. G06Q 30/018 |
| 2024/0111726 | A1* | 4/2024 | Lakshmikantha .. G06F 16/1734 |
| 2024/0171414 | A1* | 5/2024 | Johnson ................ H04L 9/50 |

* cited by examiner

Primary Examiner — Chris Parry
Assistant Examiner — Abderrahmen Chouat
(74) Attorney, Agent, or Firm — Foley & Lardner LLP

(57) ABSTRACT

The present disclosure is directed to systems, methods, and non-transitory computer-readable media including generating a token using an electronic file, the electronic file having a title and a content, and the token including a title hash based on the title of the electronic file and a file hash based on the content of the file and verifying the token based on at least one of the title hash, the file hash, and the signature.

20 Claims, 4 Drawing Sheets

TOKENIZATION FOR BIG DATA

BACKGROUND

Tokenization can be implemented in various scenarios to protect individual data elements. Examples of data elements are printable character strings that for instance include of upper case alphabetic characters (e.g., "A" to "Z"), lower case alphabetic characters (e.g., "a" to "z"), numeric characters (e.g., "0" to "9"), special characters (e.g., punctuations), and so on. Examples of data elements in Payment Card Industry Data Security Standard (PCI DSS) include 16-digit Primary Account Number (PAN) include a 6-digit Bank Identification Number (BIN) (e.g., "bbb bbb,"), a 9-digit card number (e.g., "nnn nnn nnn"), and a 1-digit Luhn check digit (e.g., "c"). ISO/IEC 7812-1:2017 increases the BIN to 8 digits. A document may include a combination of different printable character strings. Big data such as entire documents having formats including PDF, JPG, PNG, etc. is not parsed, thus posing challenges for tokenization. Cleartext big data is associated with significant risk of unauthorized data disclosure or data breach incident.

SUMMARY

In some arrangements, systems, methods, and non-transitory computer-readable media include generating a token using an electronic file, the electronic file having a title and a content, and the token including a title hash based on the title of the electronic file and a file hash based on the content of the file and verifying the token based on at least one of the title hash, the file hash, and the signature.

These and other features, together with the organization and manner of operation thereof, will become apparent from the following detailed description when taken in conjunction with the accompanying drawings.

DETAILED DESCRIPTION

Referring generally to the FIGS., apparatuses, systems, methods, and non-transitory computer-readable media described herein relate to tokenization of big data (e.g., electronic files). In some arrangements, two different data elements of an electronic file such as the file title or file name and the file itself are hashed to generate two unique reference hash values. Further, one or more information fields from the electronic file can be individually hashed and/or tokenized to generate additional reference values. All of the reference values are combined into an ordered data object that is cryptographically signed using a symmetric or asymmetric method, such as a digital signature. As referred to herein, an electronic file is a complete and defined unit of electronic data. Examples of the electronic file include an electronic document (including information that can be processed to display printable character strings), and so on. An electronic folder is a group of zero (empty folder) or one or more electronic files. An electronic volume is a group of zero (empty volume) or one or more folders. The electronic data can refer to one or more electronic files, electronic folders, or electronic volumes, or the information making up the one or more electronic files, electronic folders, or electronic volumes.

Figure 1:
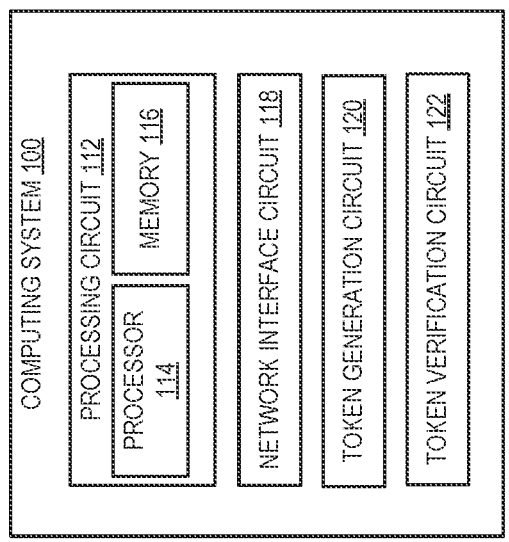
FIG. 1 is a block diagram of a system configured to tokenize big data, according to some arrangements.

FIG. 1 is a block diagram of a computing system 100 configured to tokenize big data, according to some arrangements. The computing system 100 has processing, storage, and networking capabilities. For example, the computing system 100 includes at least a processing circuit 112, a network interface circuit 118, a token generation circuit 120, and a token verification circuit 122. The computing system 100 can be Internet-connected or network-connected computing devices e.g., computers, servers, mobile devices, datacenters, smartphones, smart wearables, etc. The computing system 100 can include any type of device or system configured to execute one or more software applications. In some arrangements, the computing system 100 can include an operating system (e.g., Windows, Linux, MAC OS, etc.) on which the software applications can be executed.

In some arrangements, the computing system 100 includes a processing circuit 112 having a processor 114 and a memory 116. The processor 114 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 116 (e.g., Random Access Memory (RAM), Read-Only Memory (ROM), Non-Volatile RAM (NVRAM), Flash Memory, hard disk storage, etc.) stores data and/or computer code for facilitating the various processes described herein. Moreover, the memory 116 is or includes tangible, non-transient volatile memory or non-volatile memory. Accordingly, the memory 116 includes database components, object code components, script components, or any other type of information structure for supporting the various activities and information structures described herein. The processing circuit 112 can be used to implemented one or more of the circuits 118, 120, and 122.

The computing system 100 can transfer communications, data, information, messages, certificates, and so on, using a network. The network is any suitable Local Area Network (LAN), Wide Area Network (WAN), or a combination thereof. For example, the network 110 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like. The network is structured to permit the exchange of data, values, instructions, messages, and the like.

In that regard, the network interface circuit 118 is configured for and structured to establish a connection and communicate with another device via the network. The network interface circuit 118 is structured for sending and receiving data over a communication network. Accordingly, the network interface circuit 118 includes any of a cellular transceiver (for cellular standards), wireless network transceiver (for 802.11X, ZigBee, Bluetooth, Wi-Fi, or the like), wired network interface, or a combination thereof. For example, the network interface circuit 118 may include wireless or wired network modems, ports, baseband processors, and associated software and firmware. The network interface circuit 118 can send an electronic file, receive an electronic file, send a token of the electronic file, receive a token of the electronic file, and so on.

The token generation circuit 120 is structured to generate a token of big data in the manner described herein. Examples of the big data includes an electronic file (e.g., an electronic document), an electronic folders, an electronic volumes, so on. The token is the tokenized version of the big data. The token generation circuit 120 can be implemented using the processing circuit 112. The token generation circuit 120 can for example perform the functions 240, 242, 244, and 246 shown in FIG. 2. The token verification circuit 122 is structured to verify the token generated by the token generation circuit 120. The token verification circuit 122 can be implemented using the processing circuit 112. The circuits 120 and 122 can be implemented on a same computing system 100 using the same processing circuit 112 (e.g., the circuits 120 and 122 reside on the same network node), in some examples. In other examples, the circuits 120 and 122 can be implemented on different systems, each of which can be the computing system 100 and using different processing circuits, each of which can be the processing circuit 112.

While various circuits, interfaces, and logic with particular functionality are shown, it should be understood that the computing system 100 includes any number of circuits, interfaces, and logic for facilitating the operations described herein. For example, the activities of multiple circuits are combined as a single circuit and implemented on the same processing circuit (e.g., the processing circuit), as additional circuits with additional functionality are included.

Figure 2:
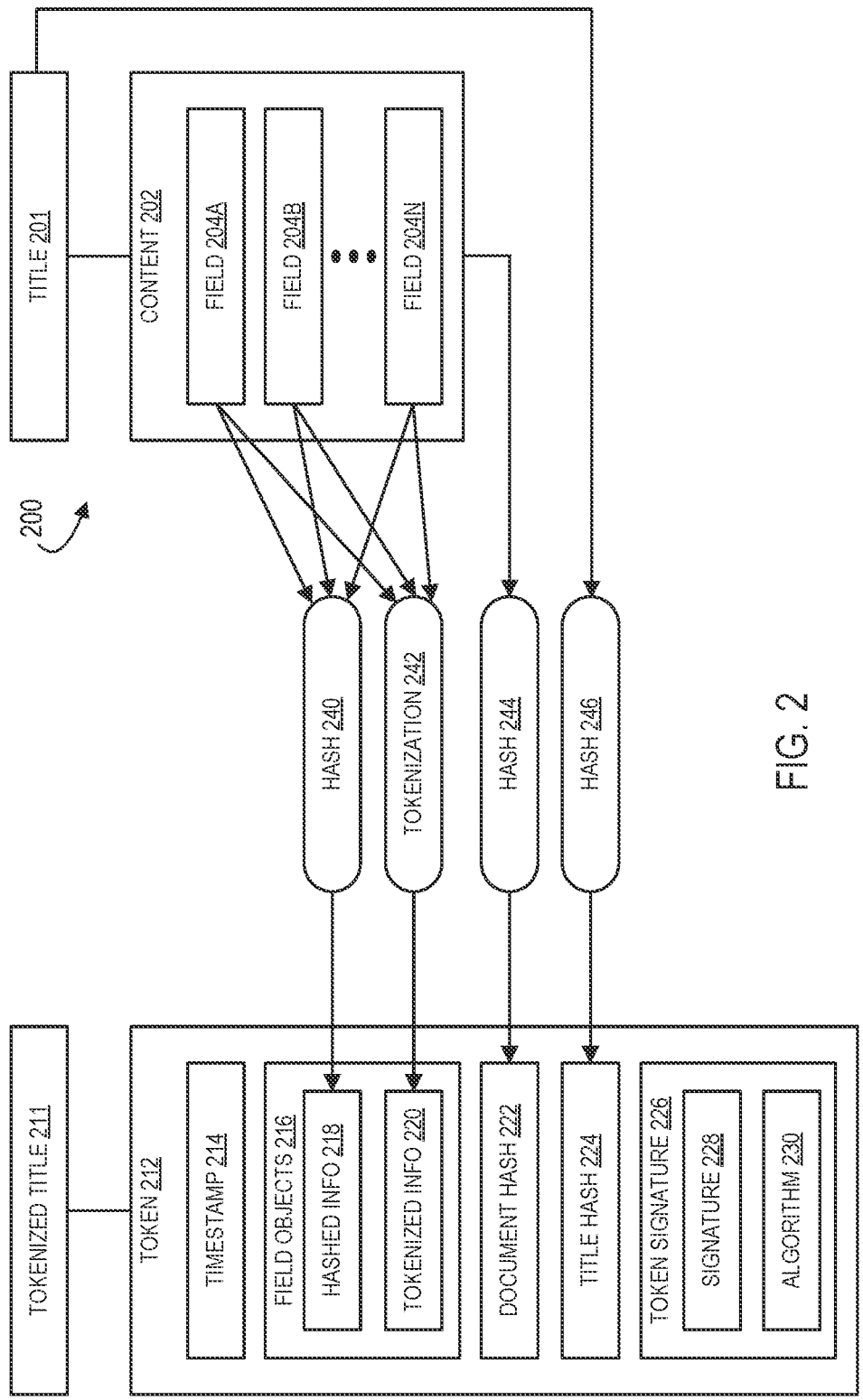
FIG. 2 is a schematic diagram illustrating a method for tokenize big data, according to some arrangements.

FIG. 2 is a schematic diagram illustrating a method for tokenize big data, according to some arrangements. The big data, which can be an electronic file 200 (or electronic file, etc.) includes a title 201 and content 202. Examples of the file 200 can include PDF, JPG, PNG, DOC, DOCX, and so on. Examples of the file 200 include mortgage document, loan document, tax document, legal documents, warranty, agreement, and so on. In some examples, the original file title 201 and the original content 202 of the file 200 can be used to verify the content of the token 212. The resulting token 212 or representation generated based on or for the electronic file 200 includes at least a timestamp 214, a file hash 222, a title hash 244, and a token signature (e.g., sign(T*) 226).

The title 201 can be a document title, a document name, a file name, a file title, or so on. The title 201 can used as an input to generate a title 211 to identify a big data token 212. The token 212, when stored as a file in a token database, is given a file name including a token-related prefix and/or suffix (e.g., "Token," "Token-2022-8-27-," and so on) and the original document file name (e.g., "Mortgage Example 2022 8 22.pdf"). In the example in which the file title 201 is "Mortgage Example 2022 8 22.pdf," the title 211 can be "Token-2022-8-27-Mortgage Example 2020-8-22.pdf." Thus, the title 211 is generated by adding at least one of a prefix or suffix to the title 201 of the file 200. Accordingly, the token 212 uses an extended title 211 including prefix and/or suffix based on the file title 201 for traceability and accountability.

The content 202 includes printable character strings. Examples of the printable character strings include of upper case alphabetic characters (e.g., "A" to "Z"), lower case alphabetic characters (e.g., "a" to "z"), numeric characters (e.g., "0" to "9"), special characters (e.g., punctuations), and so on. The content 202 can include data and information that are non-printable character data. The content 202, including printable character strings and non-printable character dataaa, can be represented by a binary string (e.g., 0s and 1s) without any preprocessing.

The file 200 (e.g., the content 202) can be displayed using a display device (e.g., a monitor) to a viewer or printed using a printer. The content 202 can include fields 204A, 204B, . . . , 204N. The fields 204A, 204B, . . . , 204N can define a starting point (e.g., a starting printable character) and an end point (e.g., an ending printable character) of a segment of at least one printable character string. The data (e.g., the printable character strings) included in the fields 204A, 204B, . . . , 204N can be manually entered (e.g., via an input device such as a touchscreen, keyboard, microphone, and so on). Example of the fields 204A, 204B, . . . , 204N include a form field of an Adobe PDF document, a field of a Microsoft WORD document, Microsoft XLXS document, and so on. In some examples, each of the fields 204A, 204B, . . . , 204N is defined by a boundary such as a rectangle, a box, an underline, a paragraph, a period sign, a semi-colon sign, and so on. In some examples, the data (e.g., the printable character strings) included in the fields 204A, 204B, . . . , 204N can be determined using Optical Character Recognition (OCR). The data for a field can be recognized using OCR as the characters within the boundary. Each field can include printable character strings. Examples of printable character strings in a field can include, in PCI DSS, 16-digit PAN ("bbb bbb nnn nnn nnn c") include a 6-digit BIN (e.g., "bbb bbb,") or a 8-digit BIN, a 9-digit card number (e.g., "nnn nnn nnn"), and a 1-digit Luhn check digit (e.g., "c"). Other examples of printable character strings include Social Security Number (SSN), name, address, date of birth, identification numbers, account numbers, passwords, account names, and so on. In the examples in which one or more of the fields 204A, 204B, . . . , 204N is empty (no printable character strings included or OCR has failed to recognize any printable character), the hashed information 218 and the tokenized information 220 corresponding to the one or more of the fields 204A, 204B, . . . , 204N is empty, 0, null, or does not exist.

The timestamp 214 identifies a time by which the token 212 is generated. The timestamp includes information such as a date in the format of "YYYY-MM-DD" and more granular time information in the format of HH-MM-SS, and/or tenth or hundreds of a second.

The file hash 222 is a hash of the content 202. For example, the file hash 222 can be generated by running the content 202 through a hashing function 244. Examples of the hashing function 244 includes SHA-256 or SHA-512. The printable character strings included in the content 202 or other data in the content 202 can be run through the hashing function 244. The input to the hashing function 244 include some or all of the printable character strings in the content 202 of the file 200, including the printable character strings in the fields 204A, 204B, . . . , 204N and in some cases additional printable character strings other than the printable character strings in the fields 204A, 204B, . . . , 204N. In some examples, the input of the hash function 244 includes the content 202 in binary string (e.g., 0s and is without any preprocessing). The binary string can represent the printable character strings and the non-printable character data. For example, the SHA-256 of a 14 KB file example.docx with the characters "example" in the content 202 includes the hexadecimal string "5360694dce83271951488b3cb7b0cd62b4b8b83753e58ee a16b614bcf0b8eb08."

The title hash 224 is a hash of the title 201. For example, the tile hash 224 can be generated by running the title 201 through a hashing function 246. Examples of the hashing function 246 includes SHA-256 or SHA-512. In some examples, the input of the hash function 246 includes the title 201 in binary string (e.g., 0s and is without any preprocessing). Including the document hash 222 and the title hash 224 in token 212 binds the content 202 and title 201 to the token 2.

In some examples, the token 212 includes a field objects 216 (e.g., fields(N)) having one or more of hashed information 218 (e.g., hash(F)) or tokenized information 220 (e.g., token(F)) extracted from the content 202, for example, for business process shortcuts. For example, the hashed information 218 can include hashed fields generated from the data stored in the fields 204A, 204B, . . . , 204N, such as customer names, Social Security Numbers (SSNs), account numbers, Personally Identifiable Information (PII), hospital names, Protected Healthcare Information (PHI), and so on. The hashed information 218 can be generated by running the information (e.g., the printable character strings) contained in the fields 204A, 204B, . . . , 204N through a hash function 240. The tokenized information 220 includes tokenized fields generated from the data included in the fields 204A, 204B, . . . , 204N. The tokenized information 220 can be generated by running the information contained in the fields 204A, 204B, . . . , 204N through a tokenization process 242. Examples of the tokenization process 242 include at least one of replacing one or more characters of the printable character strings of a field with at least one tokenized character, moving one or more characters of the printable character strings of a field to another position in the printable character strings, re-computing a check digit, and so on.

Accordingly, the token 212 can contain hashed information 218 and/or tokenized information 220 extracted from the content 202 of the file 200 for further verification to support business shortcuts. The field objects 216 are different from the file hash 222, although they may be based at least partially on the same information (e.g., the data in the fields 204A, 204B, . . . , 204N). That is, business processes can rely on any hashed or tokenized data field contained in the token 212.

The token signature 226 can be used to verify the integrity and authenticity of the token 212 and can include one or more cryptographic signatures 228. Examples of the signature 228 include digital signature, Cryptographic Message Syntax (CMS), Message Authentication Code (MAC), Keyed Hashed Message Authentication Code (HMAC), and so on. The token signature 226 includes identification of the algorithm 230 of the signature 228. In some examples, the token signature 226 can be generated over the timestamp 214, the field objects 216, the file hash 222, and the title hash 224. In some examples, the token signature 226 can be generated over the timestamp 214, the file hash 222, and the title hash 224.

In some examples, the content 202 can be a folder, a composite, a compressed file (e.g., ZIP file of electronic files), a volume including multiple folders, each of which can be the file as described herein. In that regard, each of the field 204A, 204B, . . . , 204N can be an electronic file having the content e.g., binary string corresponding to printable character strings and non-printable character data. The hashed information 218 can be determined for each electronic file within the composite. That is, the at least one printable character string for each electronic file in the composite can be run through the hash function 240 to generate the hashed information 218 for that electronic file/field. The tokenized information 220 can be determined for each electronic file within the composite. That is, the binary string for each electronic file in the composite can be run through the tokenization process 242 to generate the tokenized information 220 for that electronic file/field. The file hash 222 of the content 202 can be a hash of the aggregate content of the electronic files in the composite. For example, the binary string of the electronic files can be concatenated to generate the aggregate, sum, or combination of the binary string of the electronic files, which can be run through the hash function 244 to generate the file hash 222. The title 201 of the file 200 is the title of the folder, the composite, or the compressed file, and the corresponding title 211 is generated based on the title 201 as described.

The token 212, generated once, can be verified innumerable times, can be used by business processes, can be referenced by business procedures, and can remain benign. When a business process needs to process, transmit, or store sensitive data elements (e.g., information included in the content 202, including the fields 204A, 204B, . . . , 204N), tokenization of the file 200 can be used to protect the sensitive data elements by creating a benign version (i.e., the token 212) of the file 200. The arrangements of the present disclosure allow the tokenization of big data, to protect the big data by creating a benign version (the token) that can be verified using the original file.

Figure 3:
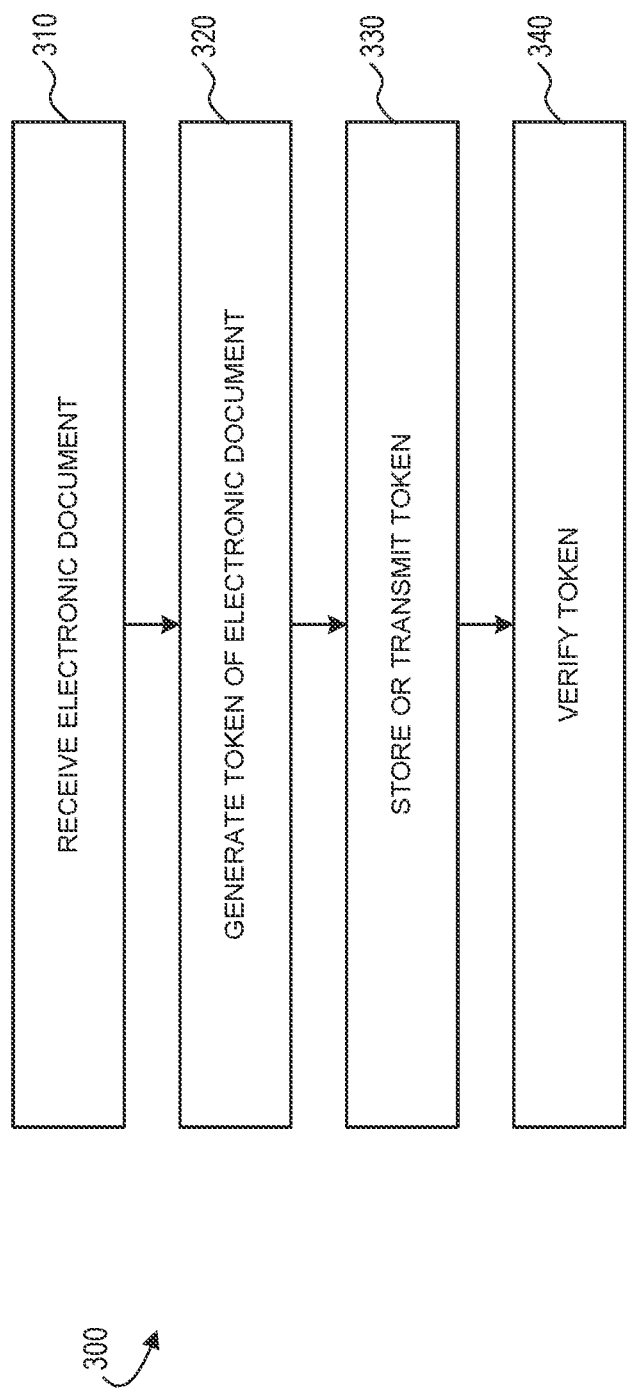
FIG. 3 is a flowchart diagram illustrating an example method for using a token of an electronic file, according to some arrangements.

FIG. 3 is a flowchart diagram illustrating an example method 300 for using a token (e.g., the token 212) of an electronic file (e.g. the file 200), according to some arrangements. The method 300 can be performed by the computing system 100. The method 300 can be applied to multiple electronic files, each of which can be the file 200.

At 310, the token generation circuit 120 can receive or retrieve an electronic file (e.g., the file 200). For example, the network interface circuit 118 can receive the file 200 via a network from another computing device and relay the file 200 to the token generation circuit 120. For example, the token generation circuit 120 can retrieve the file 200 from a database or another suitable memory device.

At 320, the token generation circuit 120 generates the token 212. As described in further details herein, generating the token 212 includes one or more of generating the title 211, generating the timestamp 214, generating the file hash 222, generating the title hash 224, generating the field objects 216, and generating the token signature 226. At 330, the token generation circuit 120 can store or transmit the token 212. For example, the token generation circuit 120 can store the token 212 in a token database or another suitable memory device. The token generation circuit 120 can relay the token 212 to the network interface circuit 118, so the network interface circuit 118 can send the token to another computing device via a network.

At 340, the token verification circuit 122 can verify the token 212. The business process can refer to the big data file using the token name (e.g., the title 211) and preform verification operations for differing assurance levels. In some examples, verification operations include partially matching the big data file title 201 to the expanded title 211, which may include additional texts (e.g., token-related prefix). In response to matching the title 201 (or at least a portion thereof) to a portion of the title 211, the token 212 can be verified. In some examples, verification operations include checking the timestamp 214 to verify when the token 212 is generated. In response to verifying the timestamp 214, the token 212 can be verified. In some examples, verification operations include checking the integrity and authenticity of the token 212 by verifying the token signature 226 (based on the value of the cryptographic signature 228 and the algorithm 230 by which the cryptographic signature 228 is generated). In response to verifying the token signature 226, the token 212 can be verified. In some examples, verification operations include checking the file title 201 against the hashed title 224 in the token 212. In response to verifying the file title 201 against the hashed title 224, the token 212 can be verified. In some examples, verification operations include checking the file 202 against the hashed file 222 in the token 212. In response to verifying the file 202 against the hashed file 222, the token 212 can be verified. In some examples, verification operations include checking any of the data fields 204A, 204B, . . . , 204N against one or more of the field objects 216 (e.g., one or more of the hashed information 218 or token information 220) in the token 212. In response to verifying the fields 204A, 204B, . . . , 204N against one or more of the field objects 216, the token 212 can be verified.

Given that the token 212 can be verified at any time to one or more of assurance levels corresponding to the verification operations, business processes can rely on the tokenized big data file. The more types of the verification operations are performed, the higher the assurance level.

Figure 4:
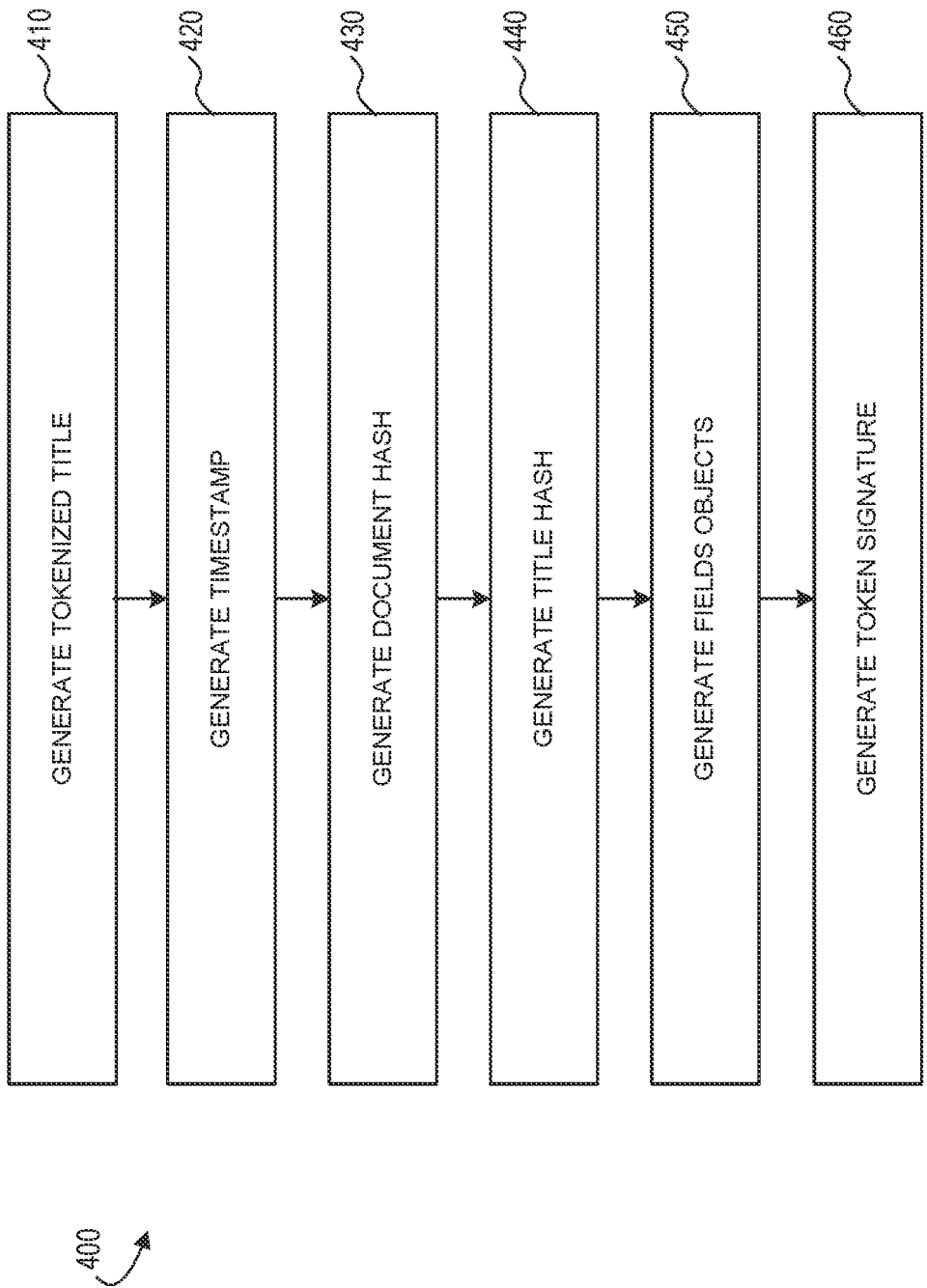
FIG. 4 is a flowchart diagram illustrating an example method for generating a token of an electronic document, according to some arrangements.

FIG. 4 is a flowchart diagram illustrating an example method 400 for generating a token (e.g., the token 212) of an electronic file (e.g., the file 200), according to some arrangements. The blocks 410, 420, 430, 440, and 450 can be performed in any suitable order or sequence. The method 400 can be applied to multiple electronic files, each of which can be the file 200.

At 410, the token generation circuit 120 generates the title 211. For example, the token generation circuit 120 can generate the title 211 by adding at least one printable character string to the title 201 of the file 200. For example, the token generation circuit 120 can generate the title 211 by adding at least one of a prefix or suffix to the title 201 of the file 200. In some examples, the token generation circuit 120 can generate the title 211 by adding at least one printable character string between two printable character strings of the title 201 of the file 200. In some examples, the token generation circuit 120 can generate the title 211 by modifying one or more two printable character strings of the title 201 of the file 200.

At 420, the token generation circuit 120 generates the timestamp 214. For example, the time stamp 214 can indicate a time that any of the blocks 410 and 430-460 is completed or a time by which all of the blocks 410 and 430-460 are completed.

At 430, the token generation circuit 120 generates the file hash 222. For example, the token generation circuit 120 can generate the file hash 222 by running the content 202 through a hashing function 244. Examples of the hashing function 244 includes SHA-256 or SHA-512.

At 440, the token generation circuit 120 generates the title hash 224. For example, the token generation circuit 120 can generate the title hash 224 by running the title 201 through a hashing function 246. Examples of the hashing function 246 includes SHA-256 or SHA-512.

At 450, the token generation circuit 120 generates the field objects 216, including generating at least one of the hashed information 218 or the tokenized information 220. For example, the token generation circuit 120 can run the information (e.g., the printable character strings) contained in each of the fields 204A, 204B, . . . , 204N through the hash function 240 to generate the hashed information 218 for that field. Accordingly, the field objects 216 can include the hashed information 218 corresponding to each of the fields 204A, 204B, . . . , 204N. For example, the token generation circuit 120 can run the information (e.g., the printable character strings) contained in each of the fields 204A, 204B, . . . , 204N through the tokenization process 242 to generate the tokenized information 220 for that field. Accordingly, the field objects 216 can include the tokenized information 220 corresponding to each of the fields 204A, 204B, . . . , 204N. In the examples in which the electronic file 200 is a folder or compressed file of electronic files, and each of the fields 204A, 204B, . . . , 204N is itself an electronic file, the information (e.g., the printable character strings) contained in each of the fields 204A, 204B, . . . , 204N is the information (e.g., the printable character strings) contained in each of those electronic files in the folder or compressed file.

At 460, the token generation circuit 120 generates the token signature 226. The token signature 226 wraps around the token 212 (the elements thereof). The token signature 226 includes the cryptographic signature 228 (e.g., a signature value) and an identifier that identifies the algorithm 230 by which the signature 228 is generated. Examples of the signature 228 include digital signature, Post-Quantum Cryptography (PQC), MAC, HMAC, and so on. The algorithm 230 for the digital signature can include one or more of Rivest, Shamir, and Adleman (RSA), Digital Signature Algorithm (DSA), Elliptical Curve Digital Signature Algorithm (ECDSA), and so on. The algorithm 230 for PQC can include one or more of CRYSTALS-DILITHIUM, FALCON, and SPHINCS+. The algorithm 230 for MAC can include Advanced Encryption Standard (AES). The algorithm 230 for HMAC can include SHA-256. The signature 228 can be verified based on the value of the signature 228 and the identifier of the algorithm 230 by which the signature 228 is generated. In some examples, the signature 226 can be generated over the timestamp 214, the field objects 216, the file hash 222, and the title hash 224. In some examples, the signature 226 can be generated over the timestamp 214, the file hash 222, and the title hash 224 when the field object 216 is not used.

In some examples, alternative to or in addition to the token signature 226, the token generation circuit 120 can wrap the token 212 in a X9.95 Trusted Time Stamp. For example, the network interface circuit 118 transmits a hash the token 212 (with the token signature 226 or without the token signature 226) to a Time Stamp Authority (TSA), which cryptographically binds (e.g., using MAC or digital signature) the unsigned token 212 to a time stamp based on a calibrated clock of the TSA to generate a Time Stamp Token (TST).

In some arrangements, the tokens 212 and the titles 211 for different versions of the file 200 that may contain different data (e.g., at least one different printable character string) can be generated at different points in time, defined by the timestamp 214 and/or the Trusted Time Stamp. Different version of the file 200 can be different revisions to a legal document, updated information for a form, technology standards, bills for legislation, and so on. Different tokens 212 and the titles 211 corresponding to different version of the file 200 can be stored in a database and associated or otherwise linked to the same file 200. In some examples, a blockchain can be used to store different tokens 212 corresponding to the different version of the same file 200. For example, an earlier generated token 212 corresponding to an earlier version of the file 200 can be added first to the blockchain, and a subsequently generated token 212 corresponding to a subsequent version of the file 200. This provides forensic record of the versions of the file 200 for auditing.

In some examples, for verifying the tokens 212 at 340, a first token of the tokens 212 can be verified first in time. In response to determining that the first token fails to verify, a second token of the tokens 212 with an earliest timestamp 214 or Trusted Time Stamp can then be verified.

In some examples, for verifying the tokens 212 at 340, the token 212 with the latest timestamp 214 or Trusted Time Stamp can be verified first in time. In response to determining that the token 212 with the latest timestamp 214 or Trusted Time Stamp fails to verify, another token 212 of the multiple tokens 212 with the second latest timestamp 214 or Trusted Time Stamp can then be verified.

In some examples, for verifying the tokens 212 at 340, the token 212 with the earliest timestamp 214 or Trusted Time Stamp can be verified first in time. In response to determining that the token 212 with the earliest timestamp 214 or Trusted Time Stamp fails to verify, another token 212 of the multiple tokens 212 with the second earliest timestamp 214 or Trusted Time Stamp can then be verified.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present disclosure.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may include or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method, comprising:
    generating a token using an electronic file, the electronic file having a title and a content, and the token comprising a title hash based on the title of the electronic file and a file hash based on the content of the electronic file, wherein a signature is generated over at least the title hash and the file hash; and
    verifying the token based on the title hash, the file hash, and the signature, comprising:
    verifying the signature;
    in response to verifying the signature:
        checking the title hash in the token against a hash on the title of the electronic file; and
        checking the file hash in the token against a hash on the content of the electronic file.

2. The method of claim 1, wherein the content of the electronic file comprises printable character strings and non-printable character data.

3. The method of claim 1, comprising generating a title for the token based on the title of the electronic file, the title identifies the token.

4. The method of claim 3, wherein the title is generated by adding at least one of a prefix or suffix to the title of the electronic file.

5. The method of claim 1, wherein the token comprises a cryptographic signature, the cryptographic signature comprising at least one of a digital signature, Message Authentication Code (MAC), or Keyed Hashed Message Authentication Code (HMAC).

6. The method of claim 1, wherein the token comprises a timestamp indicating a time by which token is generated.

7. The method of claim 1, comprising generating the title hash using the title of the electronic file, generating the title hash comprising running the title of the electronic file through a hashing function.

8. The method of claim 7, wherein the hashing function comprises SHA-256 or SHA-512.

9. The method of claim 1, comprising generating the file hash using the content of the electronic file, generating the file hash comprising running binary strings corresponding to the content of the electronic file through a hashing function.

10. The method of claim 9, wherein the hashing function comprises SHA-256 or SHA-512.

11. The method of claim 1, wherein
    the content comprises at least one field;
    the token comprises at least one field object generated using data contained in the at least one field.

12. The method of claim 11, wherein
    the at least one field object comprises at least one of hashed information generated using the data contained in the at least one field or tokenized information generated using the data contained in the at least one field.

13. The method of claim 12, comprising generating the hashed information by running the data contained in the at least one field through a hash function.

14. The method of claim 12, comprising generating the tokenized information by running the data contained in the at least one field through a tokenization function.

15. The method of claim 1, wherein
    the electronic file comprises a folder or a compressed file; and
    the content comprises a plurality of electronic files.

16. The method of claim 1, comprising wrapping the token in a Time Trusted Stamp.

17. A non-transitory computer-readable medium comprising computer-readable instructions, such that, when executed, causes a processor to:
    generate a token using an electronic file, the electronic file having a title and a content, and the token comprising a title hash based on the title of the electronic file and a file hash based on the content of the electronic file, wherein a signature is generated over at least the title hash and the file hash; and
    verify the token based on the title hash, the file hash, and the signature, comprising:
    verifying the signature;

in response to verifying the signature:
  checking the title hash in the token against a hash on the title of the electronic file; and
  checking the file hash in the token against a hash on the content of the electronic file.

18. The non-transitory computer-readable medium of claim 17, wherein
  the token comprises a timestamp indicating a time by which token is generated;
  the token comprises a cryptographic signature, the cryptographic signature comprising at least one of a digital signature, Message Authentication Code (MAC), or Keyed Hashed Message Authentication Code (HMAC); and
  the token has a title based on the title of the electronic file, the title identifies the token.

19. A system, comprising:
  a memory; and
  a processor configured to:
    generate a token using an electronic file, the electronic file having a title and a content, and the token comprising a title hash based on the title of the electronic file and a file hash based on the content of the electronic file, wherein a signature is generated over at least the title hash and the file hash; and
    verify the token based on the title hash, the file hash, and the signature, comprising:
    verifying the signature;
    in response to verifying the signature:
      checking the title hash in the token against a hash on the title of the electronic file; and
      checking the file hash in the token against a hash on the content of the electronic file.

20. The system of claim 19, wherein
  the token comprises a timestamp indicating a time by which token is generated;
  the token comprises a cryptographic signature, the cryptographic signature comprising at least one of a digital signature, Message Authentication Code (MAC), or Keyed Hashed Message Authentication Code (HMAC); and
  the token has a title based on the title of the electronic file, the title identifies the token.

* * * * *